US009502911B2

(12) United States Patent
Fust et al.

(10) Patent No.: US 9,502,911 B2
(45) Date of Patent: Nov. 22, 2016

(54) BATTERY CHARGING DEVICE WITH CHARGING PROFILE DATA UPDATE FACILITY

(71) Applicant: DELPHI TECHNOLOGIES, INC., Troy, MI (US)

(72) Inventors: Robert E. Fust, Rochester, MI (US); Joseph A. Finnerty, Clarkston, MI (US); Mark C. Orlosky, Girard, OH (US)

(73) Assignee: Delphi Technologies, Inc., Troy, MI (US)

( * ) Notice: Subject to any disclaimer, the term of this patent is extended or adjusted under 35 U.S.C. 154(b) by 46 days.

(21) Appl. No.: 14/425,157

(22) PCT Filed: Oct. 30, 2014

(86) PCT No.: PCT/US2014/063081
§ 371 (c)(1),
(2) Date: Mar. 2, 2015

(87) PCT Pub. No.: WO2015/069534
PCT Pub. Date: May 14, 2015

(65) Prior Publication Data
US 2016/0126768 A1    May 5, 2016

(51) Int. Cl.
*H02J 7/00* (2006.01)
*G06F 9/44* (2006.01)
(Continued)

(52) U.S. Cl.
CPC ............ *H02J 7/0044* (2013.01); *G06F 1/263* (2013.01); *G06F 1/266* (2013.01); *G06F 9/4415* (2013.01);
(Continued)

(58) Field of Classification Search
CPC .. G06F 1/263; G06F 13/4282; H02J 7/0044; H02J 2007/0096; H02J 7/0054
See application file for complete search history.

(56) References Cited

U.S. PATENT DOCUMENTS 8,508,188 B2    8/2013  Murtha et al.
8,874,819 B2 *  10/2014 Chen .................... H01R 31/005
                                                              710/305
(Continued)

FOREIGN PATENT DOCUMENTS

WO    2009086566 A1    7/2009
WO    2009086567 A1    7/2009

OTHER PUBLICATIONS

Microchip UCS8100X—Automotive USB Port Power Controller with Charger Emulation; 113 pages, Dated Oct. 28, 2013.*
(Continued)

*Primary Examiner* — Brian Misiura
(74) *Attorney, Agent, or Firm* — Robert J. Myers (57) ABSTRACT

An electronic assembly including a first connector having a first set of terminals physically and operationally compliant with a data transmission connector standard, such as USB 2.0, and a second set of terminals distinct from the first set of terminals physically compliant and operationally non-compliant with this data transmission connector standard. An electronic controller is connected to the first connector. The controller includes a memory device to store configuration data, such as a battery charging profile, used by the controller to control a first electronic device, such as a battery charging device. The second set of terminals receive new configuration data to update the configuration data stored in the memory device. The assembly may include a specially configured data cable to interconnect the assembly to a separate electronic device to transmit the updated configuration data. The assembly may reduce the current supplied for battery charging by monitoring a battery voltage.

13 Claims, 6 Drawing Sheets

(51) Int. Cl.
*G06F 1/26* (2006.01)
*G06F 13/38* (2006.01)
*G06F 13/42* (2006.01)

(52) U.S. Cl.
CPC ......... *G06F 13/385* (2013.01); *G06F 13/4282* (2013.01); *H02J 7/0054* (2013.01); *H02J 2007/0062* (2013.01); *H02J 2007/0067* (2013.01); *H02J 2007/0096* (2013.01)

(56) References Cited

U.S. PATENT DOCUMENTS

| | | | | |
|---|---|---|---|---|
| 8,947,042 B2* | 2/2015 | Kirby | ...................... | H02J 5/005 |
| | | | | 320/106 |
| 9,048,665 B2* | 6/2015 | Wojcik | ................. | H05K 5/0086 |
| 9,197,340 B2* | 11/2015 | Kabiry | ...................... | H04J 3/02 |
| 9,246,342 B2* | 1/2016 | Kondo | ................... | H02J 7/0029 |
| 2010/0055980 A1 | 3/2010 | Chen et al. | | |
| 2011/0117787 A1 | 5/2011 | Shu et al. | | |
| 2012/0030454 A1 | 2/2012 | Book et al. | | |
| 2012/0153891 A1 | 6/2012 | Yang et al. | | |
| 2013/0191653 A1 | 7/2013 | Shih et al. | | |
| 2013/0268789 A1 | 10/2013 | Yang | | |
| 2016/0004661 A1* | 1/2016 | Dixit | ....................... | G06F 1/266 |
| | | | | 710/106 |

OTHER PUBLICATIONS

International Search Report for PCT Application PCT/US2014/063081, published Jan. 28, 2015.

* cited by examiner

BATTERY CHARGING DEVICE WITH CHARGING PROFILE DATA UPDATE FACILITY

CROSS-REFERENCE TO RELATED APPLICATION

This application is a national stage application under 35 U.S.C. §371 of PCT Application No. PCT/US2014/63081 having an international filing date of Oct. 30, 2014, which designated the United States, which PCT application claimed the benefit of U.S. Provisional Application No. 61/901,478, filed Nov. 8, 2013, the entire disclosure of each of which are hereby incorporated herein by reference.

TECHNICAL FIELD OF THE INVENTION

The invention generally relates to charging a battery of an electronic device such as a cellular telephone, portable music player, or portable computer, and more particularly relates to an apparatus for charging the battery of an electronic device using a universal serial bus (USB) connection and a method of configuring the charging rate of the USB connection.

BACKGROUND OF THE INVENTION

USB 2.0 standard Type A connectors are currently used as a standardized connector for many battery charging devices that are connected to consumer electronic devices such as cellular telephones, portable music players, and portable computers via wire cables that have one connector configured to interface with the USB 2.0 Type A connectors and another connector configured to interface with the electronic device, such as a USB 2.0 micro connector. USB 2.0 Type A connectors have 4 terminals that are used to support charging a battery in the device: Bus Voltage (VBus), Ground (GND), Data + (D+), and Data—(D−). Current consumer devices typically use the D+ and D− terminals to communicate the desired battery charge current level of the VBus and GND terminals to the controller in the battery charging device if the desired battery charging current level is above the USB default current level of 0.5 Amperes (A).

There are several Universal Serial Bus standards. USB 1.1 introduced in 1998 to address issues with USB 1.0 supports data rates of up to 12 Megabits/second (Mb/s) introduced in 1998. USB 2.0 was introduced in 2000 supports data rates of up to 480 Mb/s. USB 3.0 was introduced in 2008 and supports data rates of up to 5000 Mb/s or 5 Gigabytes/second (Gb/s). The Type A and Type B connectors used with USB 1.1 and USB 2.0 standards are identical. The USB 3.0 Type A connector contains additional terminals, but is backward compatible with the Type A connector used with USB 1.1 and 2.0. The Type B connector used with USB 3.0 is not backward compatible with the USB 2.0 Type B connector. USB 2.0 standard also includes a micro Type B connector. The USB 3.0 micro connector includes a USB 2.0 micro Type B connector and a separate connector containing the additional USB 3.0 specific terminals. Universal Serial Bus standards are available from the USB Implementers Forum, Inc. of Beaverton, Oreg. or from their web site www.usb.org.

The desired battery charge current level or "charging profile" is transmitted by different voltages on the D+ and D− terminals. For example a voltage of +2.0 volts on the D+ terminal and +2.7 volts on the D terminal may indicate a charging profile of 0.750 A while a voltage of +1.5 volts on the D+ terminal and +3.0 volts on the D− terminal may indicate a charging profile of 1.5 A. The voltage level combinations for the various charging profiles are stored as charging profile data in a memory device of the controller.

As new consumer electronic devices come to market, the device manufacturers are defining new charging profiles supplying new and different charging currents that are selected from the battery charging device using new and different combinations of voltages on the D+ and D− terminals. Therefore, it is desired to provide a means of updating charging profiles so existing battery charging devices can optimally support these new electronic devices.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with a first embodiment of this invention, an electronic assembly is provided. The electronic assembly includes a first connector having a first set of terminals that are physically and operationally compliant with a data transmission connector standard and having a second set of terminals that are distinct from the first set of terminals. The second set of terminals is physically compliant and operationally non-compliant with the data transmission connector standard. The electronic assembly also includes an electronic controller that is in electrical communication with the first connector. The controller includes a memory device that is configured to store configuration data used by the controller to control a first electronic device that is in electrical communication with the controller. The second set of terminals is configured to receive new configuration data to update the configuration data stored in the memory device.

The first set of terminals may be operationally and physically compliant with the Universal Serial Bus (USB) 2.0 Type A connector standard while the second set of terminals is physically compliant with USB 3.0 Type A connector standard and operationally non-compliant with the USB 3.0 Type A connector standard. At least one terminal in the second set of terminals is configured to receive new configuration data to update the configuration data stored in the controller.

The electronic assembly may further include a second electronic device that is configured to store and transmit the new configuration data to the memory of the controller. The second electronic device has a second connector that is operationally and physically compliant with the USB 2.0 connector standard. The electronic assembly may also include a wire data cable that has a third connector that is configured to interface with the first connector and a fourth connector that is configured to interface with the second connector. The wire data cable is configured to transmit the new configuration data between the second electronic device and the memory device. The third connector has a first set of terminals that are operationally and physically compliant with the USB 2.0 Type A connector standard and a second set of terminals that are physically compliant with the USB 3.0 Type A connector standard but not operationally compliant with the USB 3.0 Type A connector standard.

The first electronic device of the electronic assembly may be configured to provide an electrical current via a first terminal and a fourth terminal of the first set of terminals and the controller may be configured to determine amperage of the electrical current supplied by the first electronic device via a second terminal and a third terminal of the first set of terminals.

The fourth connector may be physically compliant with the USB 2.0 connector standard but not operationally complaint with the USB 2.0 connector standard. In this case, the terminal of the second connector is connected to a terminal of the fourth connector and is further connected by a wire conductor to a terminal of the second set of terminals of the third connector. The terminal of the second set of terminals of the third connector is connected to a terminal of the second set of terminals of the first connector and is configured to transmit the new configuration data to the memory device of the controller.

The second connector may be operationally and physically compliant with the USB 2.0 micro connector standard. In this case, the fourth connector is physically compliant with the USB 2.0 micro connector standard but not operationally complaint with the USB 2.0 connector standard.

The first electronic device may be a battery charging device configured to charge a first battery disposed in a second electronic device distinct from the first electronic device. In this instance, the configuration data is a battery charging profile.

The first electronic device may be a battery charging circuit configured to provide an output voltage of about 5 to 20 volts, wherein the battery charging circuit is configured to charge the first battery. The battery charging circuit is configured to provide an electrical current via a first terminal and a fourth terminal of the first set of terminals and the controller is configured to determine amperage of the electrical current supplied by the battery charging circuit via a second terminal and a third terminal of the first set of terminals. An electrical current supplied by the battery charging circuit is sourced by a second battery distinct from the first battery. The electronic assembly may further include a voltage measurement circuit that is configured to be electrically connected to the second battery. The voltage measurement circuit is configured to determine a voltage of the second battery. The voltage measurement circuit in is communication with the controller and configured to provide battery voltage data to the controller. The controller is configured to reduce a current output of the battery charging circuit when the value of the battery voltage data is less than a battery voltage threshold.

In accordance with a second embodiment of this invention, a battery charging device having a first connector and configured to charge a first battery disposed in an electronic device distinct from the battery charging device is provided. The battery charging device includes an electronic controller in electrical communication with the first connector and a voltage measurement circuit configured to be electrically connected to a second battery and configured to determine a voltage of the second battery. The voltage measurement circuit is in communication with the controller and configured to provide battery voltage data to the controller. The battery charging device also includes a battery charging circuit in electrical communication with the first connector. The battery charging circuit is configured to provide an output voltage to the first connector as required by the applicable charging specification. The output voltage supplied by the battery charging circuit is sourced by the second battery. The controller is configured to reduce a current output of the battery charging circuit when the value of the battery voltage data is less than a first battery voltage threshold.

The controller may be configured to reduce a current output of the battery charging circuit to 0 Amperes when the value of the battery voltage data is less than a second battery voltage threshold. The second battery voltage threshold is less than or equal to the first battery threshold.

The first connector may include a set of terminals that are operationally and physically compliant with the USB 2.0 Type A connector standard.

The battery charging circuit may be configured to provide an output voltage of about 5 volts.

The battery charging device may be configured to be disposed within a motor vehicle. In this case, the second battery is a motor vehicle's starting battery.

In accordance with a third embodiment of this invention, another electronic assembly is provided. The electronic assembly includes an electronic controller including a memory device configured to store configuration data used by the controller to control a first electronic device in electrical communication with the controller. The electronic assembly additionally includes a first wireless transceiver in electrical communication with the controller and configured to receive new configuration data to update the configuration data stored in the memory device.

The electronic assembly may further include a first connector that is operationally and physically compliant with the USB 2.0 Type A connector standard.

The first electronic device may be a battery charging device that is configured to provide an electrical current via a first terminal and a fourth terminal of the first connector. In this case, the controller is configured to determine amperage of the electrical current supplied by the battery charging device via a second terminal and a third terminal of the first connector.

The electronic assembly may additionally include a second electronic device that is configured to store the new configuration data and including a second wireless transceiver in electrical communication with the first wireless transceiver. The second electronic device is also configured to transmit the new configuration data to update the configuration data stored in the memory device.

The electronic assembly may also include a third electronic device having a second connector electrically connected to a battery within the third electronic device; and a wire data cable having a third connector configured to interconnect with the first connector and a fourth connector configured to interconnect with the second connector. The first electronic device may be battery charging device configured to charge the battery disposed in the third electronic device distinct from the first electronic device via the wire data cable. In this instance, the configuration data is a battery charging profile.

The first connector and the third connector may be physically and operationally compliant with the USB 2.0 Type A connector standard and the second connector and the fourth connector may be physically and operationally complaint with the USB 2.0 micro connector standard.

In accordance with a third embodiment of this invention, a wire data cable is provided. The wire data cable includes a first connector having a first set of terminals physically compliant with the USB 2.0 connector standard and a second set of terminals physically compliant with the USB 3.0 connector standard. The wire data cable also includes a second connector having a set of terminals physically compliant with the USB 2.0 connector standard. A pair of wire conductors interconnects two terminals of the second connector to two terminals of the second set of terminals of the first connector such that the first connector is not operationally compliant with the USB 3.0 connector standard and the second connector is not operationally complaint with USB 2.0 connector standard.

The first connector may be physically compliant with the USB 3.0 Type A connector standard and the second connector may be physically complaint with the USB 2.0 micro connector standard.

The D+ and D− terminals of the second connector may be separately interconnected to a HI SPEED RX+ and HI SPEED RX− terminal of the first connector via the pair of conductors. Alternatively, the D+ and D− terminals of the second connector are separately interconnected to the HI SPEED TX+ and HI SPEED TX− terminals of the first connector via the pair of conductors. The D+ and D− could be connected to any combination of HI SPEED TX or RX terminals, or even to the Drain Ground terminal. Data rates and impendence are not a concern in this embodiment.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which:

FIG. 2A is a diagram of the connector and terminal configuration of a USB 2.0

Type A female connector;

FIG. 2B is a diagram of the connector and terminal configuration of a USB 3.0

Type A female connector;

DETAILED DESCRIPTION OF THE INVENTION

Figure 1:
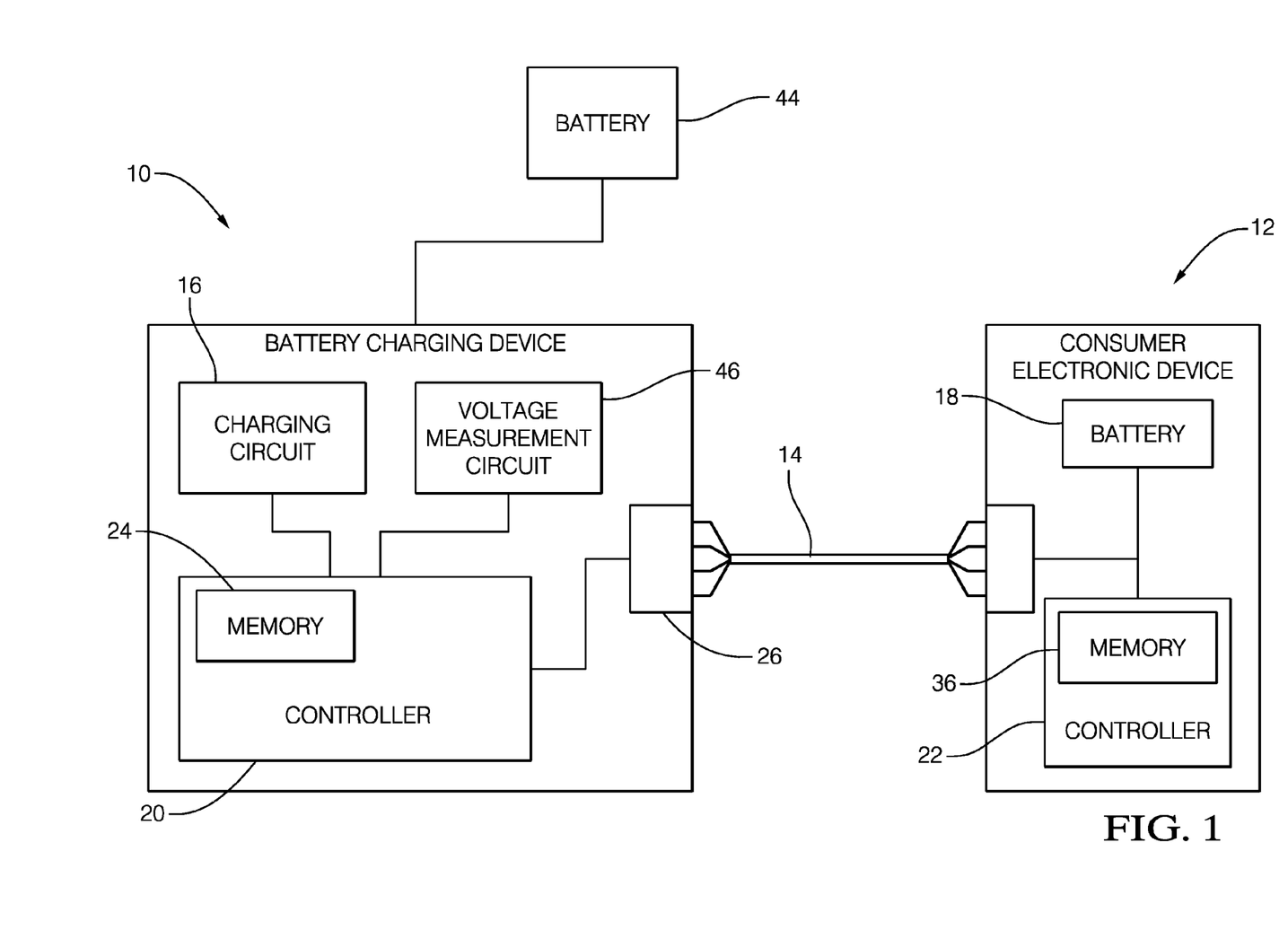
FIG. 1 is a schematic diagram of a battery charging device connected to a consumer electronic device by a standard USB cable connection.

FIG. 1 illustrates a non-limiting example of a battery charging device 10 that is configured to charge the battery 18 of an electronic device 12 such as a cellular telephone, portable music player, or portable computer using a Universal Serial Bus (USB) cable 14 having connectors in accordance with the USB 2.0 standard cable interface.

The battery charging device 10 includes a battery charging circuit 16 that is configured to supply a desired current to the battery 18 of the electronic device 12 at a desired voltage level as required by the applicable charging specification. According to the USB 2.0 standard, the charging voltage is supplied at 5.0±0.25 Volts, other charging standards may vary. The battery charging device 10 also includes a controller 20 that is configured to control the battery charging circuit 16 and to communicate with a controller 22 in the electronic device 12, in this example over the standard USB cable 14 interface. As described in the Background of the Invention, the charging profile defining the current required by the electronic device 12 is communicated to the controller 20 via the voltage values of the D+ and the D− lines of the USB cable 14. The current supplied by the battery charging device 10 may range from less than 100 mA to over 5 A. The charging profile data for the electronic device 12 includes the current level value associated with the voltage of the D+ and D− lines of the USB cable 14 and is stored in the memory 24 of the controller 20. However, as new electronic devices are brought to market having new and different charging profiles, new charging profile data may need to be stored in the memory 24 of the controller 20 to properly support charging of the batteries in the these new electronic devices.

To support updating the charging profile data, the battery charging device 10 includes a connector 26 that is USB 2.0 Standard Type A compliant, but contains at least one additional terminal to support a separate data line connected to the controller 20 in order to transmit new charging profile data to the controller 20. An example of such a connector 26 is a USB 3.0 Standard Type A compliant connector 26 which includes the VBus 102, GND 104, D+ 106, and D− 108 terminals of the USB 2.0 Type A connector, but also provides an additional group of 5 separate terminals that are USB 3.0 specific: High Speed Transmit+(HSTX+) 110, High Speed Transmit- (HSTX−) 112, Drain Ground (GND) 114, High Speed Receive+(HSRX+) 116, and High Speed Receive- ((HSRX−) 118. One or more of these USB 3.0 specific terminals may be used to transmit new charging profile data from a specially configured electronic device 25 to the controller 20.

Figure 2A:
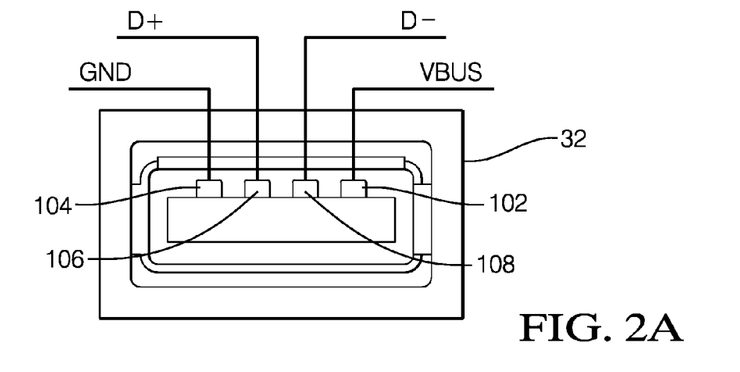
Figure 2B:
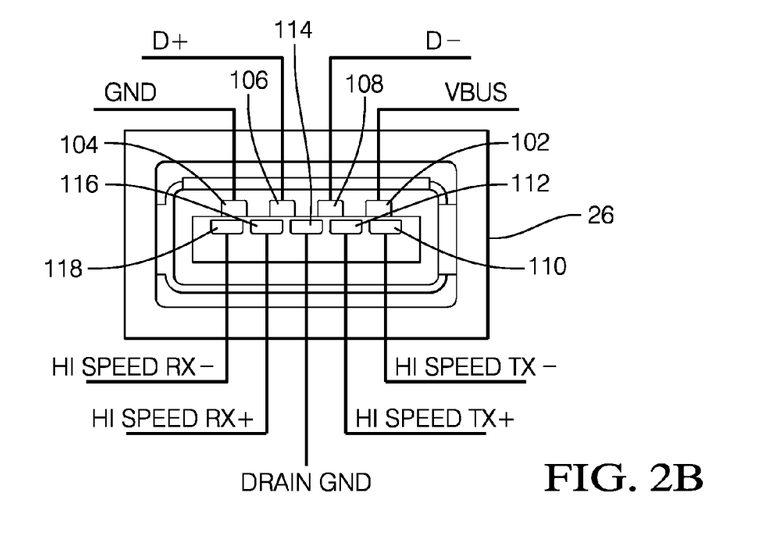
Figure 2C:
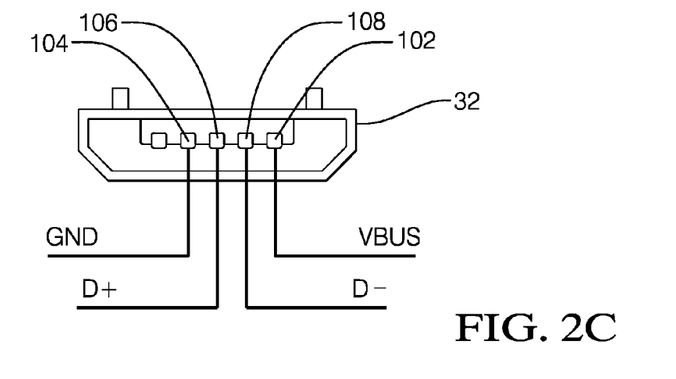
FIG. 2C is a diagram of the connector and terminal configuration of a USB 2.0 micro female connector.

FIGS. 2A-2C illustrate the terminal configuration of several standard USB connectors including USB 2.0 Type A, USB 3.0 Type A, and USB 2.0 Micro connectors.

The USB 3.0 Type A connector 26, hereafter referred to as a USB 3.0 connector 26, is backward compatible with a USB 2.0 Type A connector hereafter referred to as a USB 2.0 connector. Therefore, the USB 3.0 connector 26 can support charging the battery 18 of a consumer electronic device 12 using a standard USB 2.0 cable 14.

To update the charging profiles in the controller 20 of the battery charging device 10, the USB 3.0 connector 26 of the battery charging device 10 is connected to another specially configured electronic device 25 that contains memory 36 configured to store new charging profile data. A specially configured data cable 34 connects the electronic device 12 to the USB 3.0 connector 26. The electronic device 25 also includes a controller 22 configured to transmit the new charging profile data from the memory 36 in the electronic device 12 to the controller 20 in the battery charging device 10 via the data cable 34.

Figure 3:
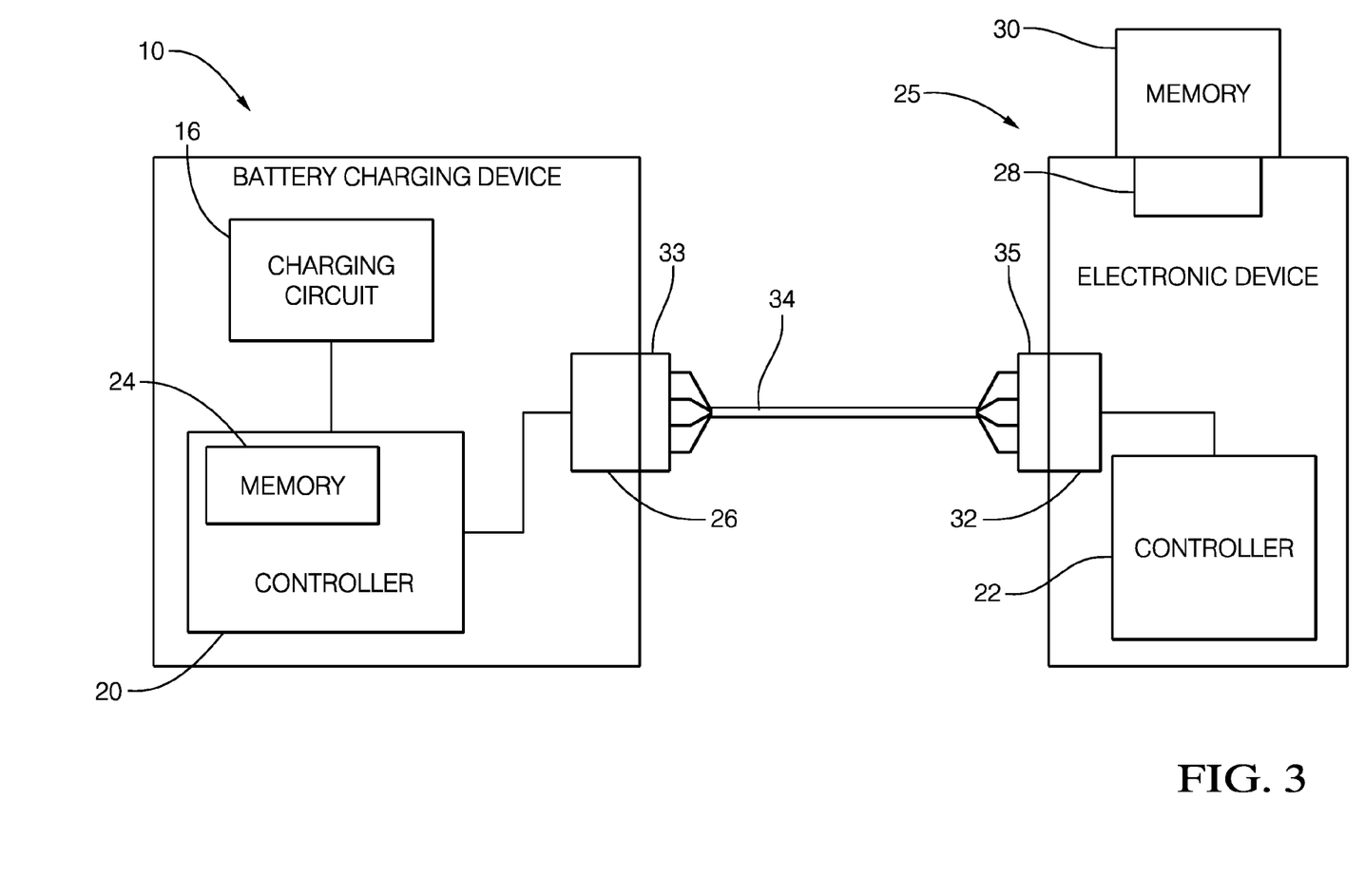
FIG. 3 is a schematic diagram of a battery charging device connected to an electronic device by a data cable connection in accordance with a first embodiment.
Figure 4A:
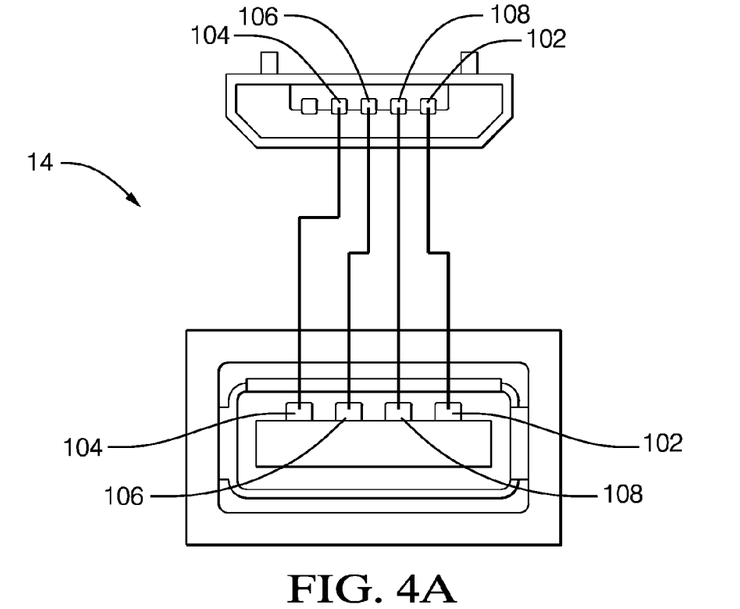
FIG. 4A is a schematic diagram of a standard cable connection between a USB 2.0 micro connector and a USB 2.0 Type A connector.
Figure 4B:
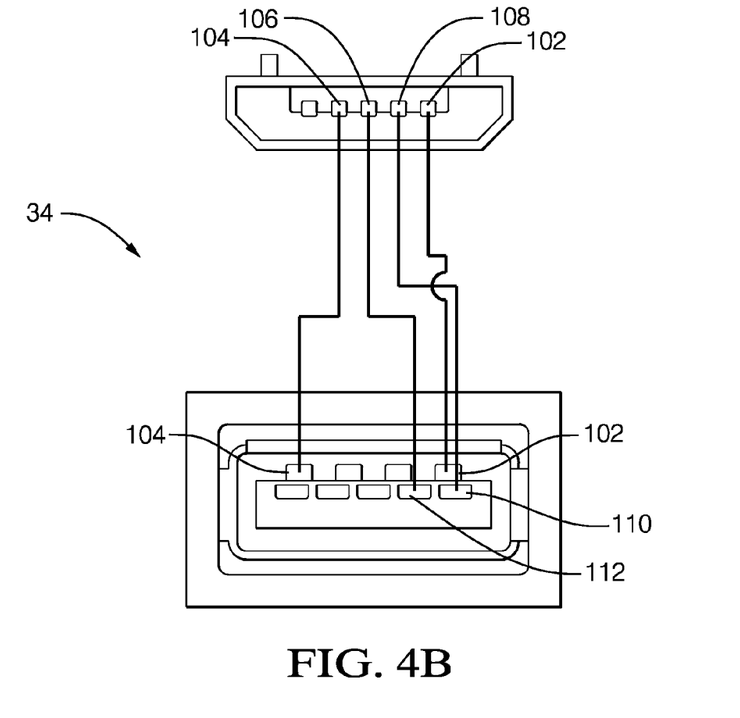
FIG. 4B is a schematic diagram of a data cable connection between a USB 2.0 micro connector and a USB 3.0 Type A connector in accordance with the first embodiment.

FIG. 3 illustrates a non-limiting example of a first embodiment of the invention. According to this first embodiment, the electronic device 25 for updating the charging profile data is a purpose built device containing a separate controller 22 and a USB 2.0 connector 28 that is configured to receive a USB memory device 30, commonly known as a "thumb drive". The USB memory device 30 contains charging profile data that may have been downloaded from a central database of charging profiles, such as from database accessed from an Internet website. The electronic device 25 also includes a USB 2.0 Standard micro B connector 32, hereafter referred to as a USB micro connector 32, configured to connect a data cable 34 to the electronic device 12 USB 3.0 connector 26 of the battery charging device 10. The data cable 34 does not conform to the standard USB cable 14 configuration. The VBus and Ground terminals 102, 104 of the USB micro connector 32 are similarly connected to the VBus and Ground terminals of the USB 3.0 connector 26. However, as shown in FIG. 4, the data cable 34 connects the D+ and D− terminals 120, 122 of the USB micro connector 32 to the HSRX+ and HSRX− terminals 116, 118 of the USB 3.0 connector 26 rather than the D+ and D− terminals 124 126 of the USB 3.0 connector 26. Alternatively, the data cable 34 may connect the D+ and D− terminals 124, 126 of the USB micro connector 32 to the HSTX+ and HSTX− terminals 110, 112 of the USB 3.0 connector 26. The HSTX terminals 110, 112 of the USB 3.0 connector 26 are connected to a data bus of the controller 20 of the battery charging device 10 that is separate from the USB data bus, such as an Inter-Integrated Circuit (I²C) data bus. The controller 22 of the electronic device 12 transmits the charging profile data from the USB memory device 30 to the controller 20 of the battery charging device 10 via the data cable 34. Alternatively, the data cable 34 may connect the D+ and D− terminals of the USB micro connector 32 124, 126 to the HSRX+ and HSRX− terminals 116, 118 of the USB 3.0 connector 26. Transmitting the charging profile data using a dedicated data cable 34 provides a level of security for the charging profile data, since it cannot be inadvertently changed over a standard data bus connection. Therefore, the connector 26 is physically compliant with the USB 3.0 standard because the terminals comply with the standard, but connector 26 is not operationally compliant because the HSTX terminals 110, 112 or HSRX terminals 116, 118 are connected to the D+ and D− terminals 124, 126 of the USB micro connector 32 rather than another set of HSTX terminals 110, 112 or HSRX terminals 116, 118.

Figure 5:
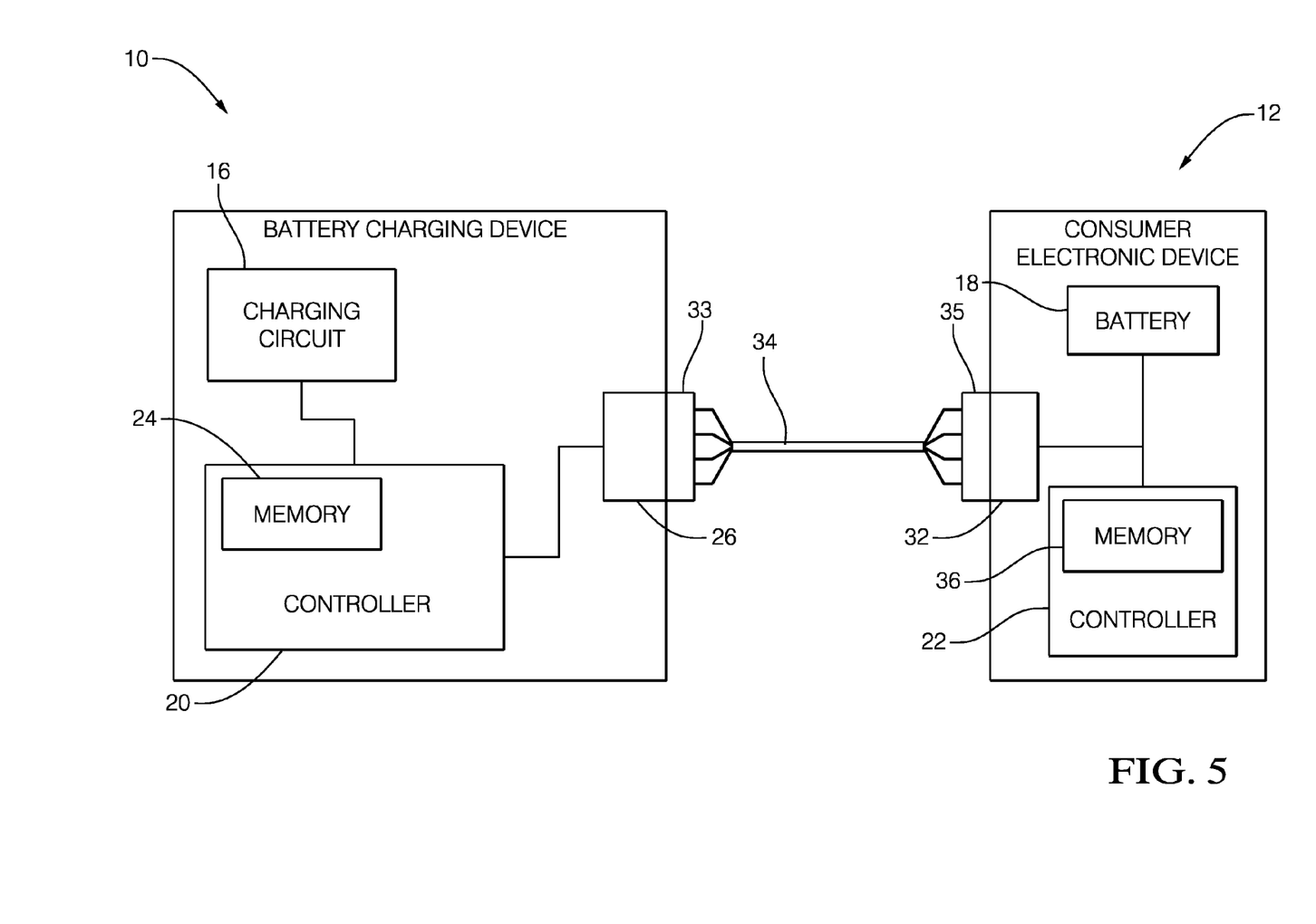
FIG. 5 is a schematic diagram of a battery charging device connected to a consumer electronic device by a data cable connection in accordance with a second embodiment.

FIG. 5 illustrates a non-limiting example of a second embodiment, wherein the specially configured electronic device 25 is a consumer electronic device 12, such as a "smart phone" or portable computer. The electronic device 12 includes a program or application stored in the in the memory 36 of the controller 22 that can access a new charging profile from an external source, such as an Internet web site and, after storing it in the memory 36, transmit the new charging profile to the battery charging device 10 via the data cable 34 connected to the USB 3.0 connector 26 of the battery charging device 10 and a USB micro connector 32 on the electronic device 12. The data cable 34 has one USB 3.0 connector 33 configured to connect to the connector 26 and a USB micro connector 35 configured to interconnect with the connector 32. Consumer electronic devices 12 typically include a USB micro connector 32. The data cable 34 connects the D+ and D− terminals 124, 126 of the USB micro connector 32 to the HSTX+ and HSTX− terminals 110, 112 of the USB 3.0 connector 26. The electronic device 12 transmits the charging profile data from the memory 36 to the controller 20 of the battery charging device 10 via the data cable 34.

Figure 6:
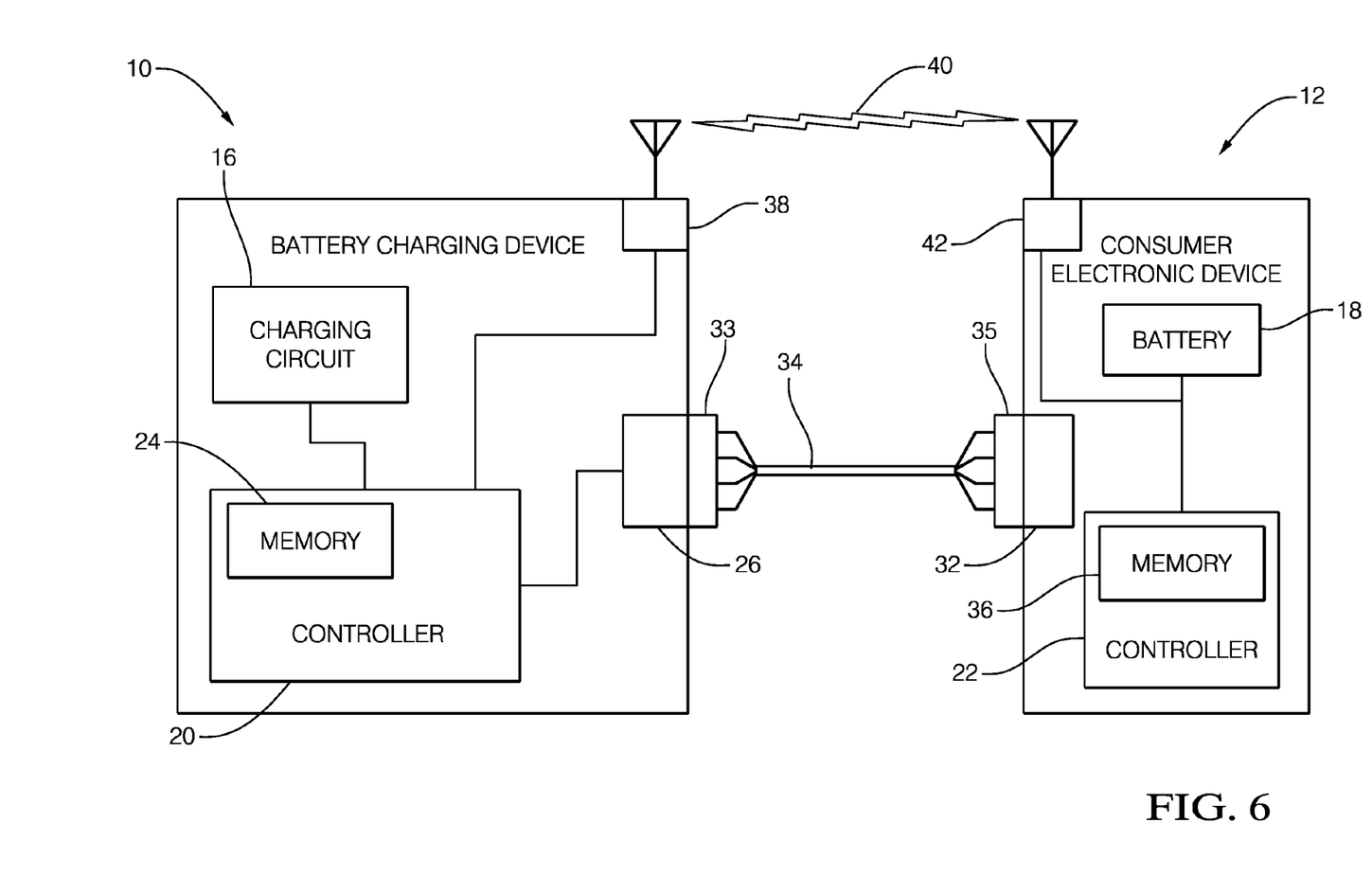
FIG. 6 is a schematic diagram of a battery charging device connected to a consumer electronic device by a wireless connection in accordance with a third embodiment.

FIG. 6 illustrates a non-limiting example of a third embodiment of the invention, wherein the battery charging device 10 includes a wireless transceiver 38, such as a BLUETOOTH short range wireless transceiver in communication with the controller 20 of the battery charging device 10. The wireless transceiver 38 is configured to establish a wireless data connection 40 with an electronic device 12 containing a compatible wireless transceiver 42, for example the electronic device 12 is a BLUETOOTH enabled cellular "smart" telephone or portable computer. The electronic device 12 includes a program or application stored in the in the memory 36 of the controller 22 that can access a new charging profile from an external source, such as an Internet web site and, after storing it in the memory 36 internal to the electronic device 12, transmit the new charging profile to the battery charging device 10 via the wireless data connection 40.

While the embodiments of the invention presented herein are described using standard USB 2.0 Type A, USB 3.0 Type A, and USB 2.0 micro connectors, other embodiments may be envisioned using other standard or custom designed connectors. The battery charging circuitry 16, controller 20, and memory device 24 of the battery charging device 10 may be implemented using a single integrated circuit, such as those manufactured by Microchip Technology, Inc. of Chandler, Arizona under model numbers UCS81001, UCS81002, or UCS81003.

Returning to FIG. 1, the battery charging device 10 may be installed in a motor vehicle. The electrical current supplied by the battery charging circuit 16 is sourced by the vehicle's battery 44. The battery charging device 10 may further include a voltage measurement circuit 46. The voltage measurement circuit 46, for example an analog/digital conversion circuit, is configured to determine the voltage of the electrical current supplied by the vehicle battery 44 and provide the vehicle battery voltage data to the controller 20. The controller 20 compares the battery voltage data to a battery voltage threshold. The controller 20 is configured to reduce a current output of the battery charging circuit 16 when a value of the battery voltage data is less than or equal to a battery voltage threshold. The controller 20 may be configured to reduce the current output of the battery charging circuit 16 to 0 A when the value of the battery voltage data is less than or equal to the battery voltage threshold. The controller 20 may have two separate thresholds and the controller 20 may reduce the current output of the battery charging circuit 16 to the default current level of 0.5 A when the battery voltage data is at or below a first higher threshold and reduce the current output of the battery charging circuit 16 to 0 A when the battery voltage data is at or below a second lower threshold.

This embodiment shown in FIG. 1 provides the advantage of disabling the battery charging circuit 16 while the voltage of the vehicle's battery 44 is still high enough to start the vehicle and avoids the problem of the battery charging circuit 16 draining the vehicle battery 44 while charging an electronic device 12 in the vehicle. Previous approaches to avoid discharging the vehicle battery 44 to a level incapable of starting the vehicle while charging an electronic device 12 relied on detecting whether vehicle ignition is on so that the vehicle's alternator would be supplying current to the vehicle battery 44, which required a separate electrical connection to an ignition input. This embodiment provides the advantage of eliminating the need for a separate ignition input thus reducing the number of wires needed by the battery charging device 10. It also provides the advantage of charging the electronic device 12 while the vehicle's ignition is off.

Accordingly, a battery charging system 10 is provided. The charging profile data in the controller 20 of the batter charging device may be updated to accommodate new charging profiles as new electronic devices are brought to market. The use of a USB 3.0 connector 26 allows the use of standard USB 2.0 cables 14 for charging electronic devices connected to the battery charging device 10. The USB 3.0 connector 26 also contains additional terminals that allow the charging profile data in the controller 20 to be updated from a portable computer or "smart phone" using a specially configured data cable 34. The controller 20 of the battery charging device 10 can receive the data needed to update the charging profile data without the need for disassembly of the battery charging device 10 or the addition of a dedicated connector to the battery charging device 10 for communication with the controller 20. The use of the USB 3.0 connector provides the benefit of using an existing standard connector type, avoiding the cost of designing and manufacturing a custom designed connector for the batter charging device.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. An electronic assembly, comprising:
a first connector including a first set of terminals physically and operationally compliant with a data transmission connector standard and a second set of terminals distinct from the first set of terminals physically compliant and operationally non-compliant with said data transmission connector standard; and
an electronic controller in electrical communication with said first connector, said controller including a memory device configured to store configuration data used by the controller to control a first electronic device in electrical communication with the controller, wherein the second set of terminals are configured to receive new configuration data to update the configuration data stored in the memory device.

2. The electronic assembly according to claim 1, wherein the first set of terminals is operationally and physically compliant with the Universal Serial Bus (USB) 2.0 Type A connector standard.

3. The electronic assembly according to claim 2, wherein the second set of terminals is physically compliant with USB 3.0 Type A connector standard and operationally non-compliant with the USB 3.0 Type A connector standard.

4. The electronic assembly according to claim 3, wherein a terminal of the second set of terminals is configured to receive data to update the configuration data stored in the controller.

5. The electronic assembly according to claim 4, further comprising:
a second electronic device configured to store and transmit said new configuration data and having a second connector operationally and physically compliant with the USB 2.0 connector standard; and
a wire data cable having a third connector configured to interface with the first connector and a fourth connector configured to interface with the second connector, said wire data cable configured to transmit said new configuration data between the second electronic device and the memory device, wherein said third connector has a first set of terminals operationally and physically compliant with the USB 2.0 Type A connector standard and a second set of terminals physically compliant with the USB 3.0 Type A connector standard but not operationally complaint with the USB 3.0 Type A connector standard.

6. The electronic assembly according to claim 5, wherein the first electronic device is configured to provide an electrical current via a first terminal and a fourth terminal of the first set of terminals and the controller is configured to determine amperage of the electrical current supplied by the first electronic device via a second terminal and a third terminal of the first set of terminals.

7. The electronic assembly according to claim 6, wherein said fourth connector is physically compliant with the USB 2.0 connector standard but not operationally complaint with the USB 2.0 connector standard, wherein a terminal of the second connector is connected to a terminal of the fourth connector and connected by a wire conductor to a terminal of the second set of terminals of the third connector, and wherein the terminal of the second set of terminals of the third connector is connected to a terminal of the second set of terminals of the first connector and is configured to transmit the new configuration data to the memory device of the controller.

8. The electronic assembly according to claim 7, wherein the second connector is operationally and physically compliant with the USB 2.0 micro connector standard and wherein the fourth connector is physically compliant with the USB 2.0 micro connector standard but not operationally complaint with the USB 2.0 connector standard.

9. The electronic assembly according to claim 1, wherein the first electronic device is a battery charging device configured to charge a first battery disposed in a second electronic device distinct from the first electronic device.

10. The electronic assembly according to claim 9, wherein the configuration data is a battery charging profile.

11. The electronic assembly according to claim 9, wherein the first electronic device is a battery charging circuit configured to provide an output voltage of about 5 volts and wherein the battery charging circuit is configured to charge the first battery.

12. The electronic assembly according to claim 11, wherein the battery charging circuit is configured to provide an electrical current via a first terminal and a fourth terminal of the first set of terminals and the controller is configured to determine amperage of the electrical current supplied by the battery charging circuit via a second terminal and a third terminal of the first set of terminals.

13. The electronic assembly according to claim 11, wherein an electrical current supplied by the battery charging circuit is sourced by a second battery distinct from the first battery, wherein the electronic assembly further comprises a voltage measurement circuit configured to be electrically connected to the second battery and configured to determine a voltage of the second battery, said voltage measurement circuit in communication with the controller and configured to provide battery voltage data to said controller, wherein the controller is configured to reduce a current output of the battery charging circuit when a value of the battery voltage data is less than a battery voltage threshold.

* * * * *